D. WARREN.

Grain Fan.

No. 5,603.

Patented May 30, 1848.

UNITED STATES PATENT OFFICE.

DAVID WARREN, OF GETTYSBURG, PENNSYLVANIA.

WINNOWING-MACHINE.

Specification of Letters Patent No. 5,603, dated May 30, 1848.

*To all whom it may concern:*

Be it known that I, DAVID WARREN, of the town of Gettysburg, in the county of Adams and State of Pennsylvania, have invented a new and useful Improvement in the Construction of Fans, which is described as follows, reference being had to the annexed drawings of the same, making part of this specification.

Figure 1:
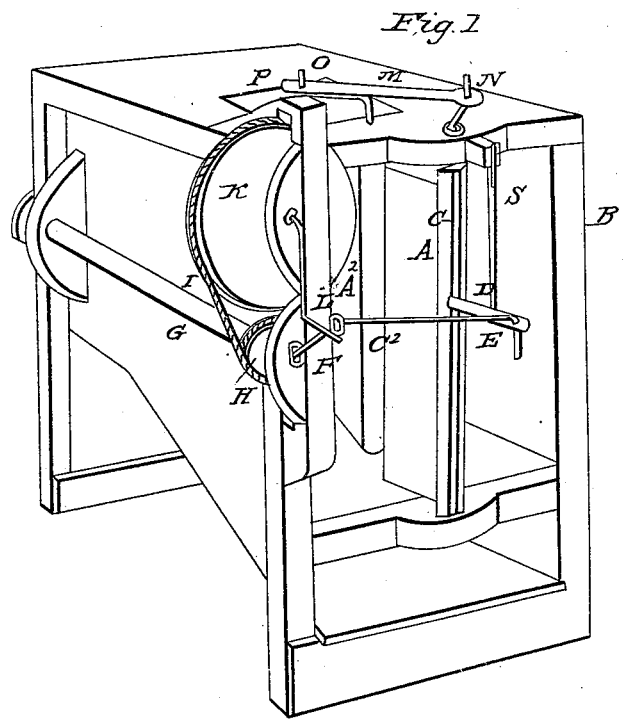
Figure 2:
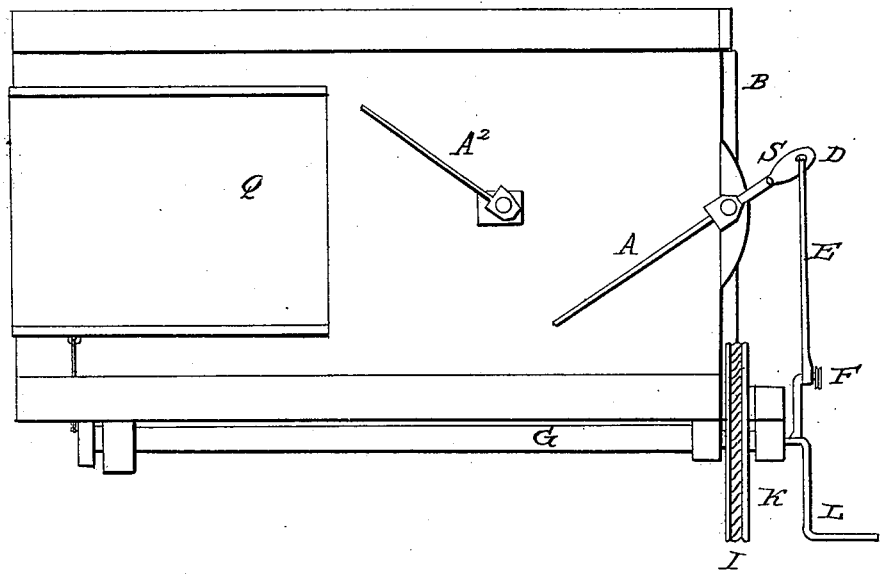

Figure 1 is a perspective view of the machine. Fig. 2 is a horizontal section of ditto.

The nature of my invention and improvement consists in a peculiar connection and arrangement of the fans as operated with the screens, propelling gear, &c., the whole constituting a new machine in its combination and the results of its action differing from any other known thing in use.

The fan A is arranged at the mouth of the case B, on a vertical axle C and giving it a vibratory action by combining with it an arm D, connecting rod E, crank F and horizontal shaft G, said shaft being arranged longitudinally on the outside of the case, turning in suitable boxes in the frame and being put in motion by means of a small pulley H thereon, around which an endless band I, passes leading to a larger pulley K on the axle to which the driving crank L is affixed for propelling the machine when driven by hand power, the small crank F being connected to the end of the horizontal shaft G and turning with it and giving the vibratory motion to the fan A, having an additional vibratory fan $A^2$ arranged in like manner on a vertical shaft $C^2$ placed inside the case and caused to vibrate simultaneously with the one first named by connecting it therewith by means of a connecting rod M attached to cranks N, O, formed on the upper ends of the axles C, $C^2$, of the vertical shafts above the case, the fans being made to vibrate simultaneously and in opposite directions with the screens, which are also vibrated by the motion of the shaft G.

The frame and case are made and arranged in the usual manner.

P is the hopper. Q is the shoe containing the screens.

S is a spring to prevent any jar in the movement of the fan having its upper end fastened to the top of the case B, and its lower end to the arm D.

The shoe and screens being made, arranged and operated in the usual manner need not be particularly described or represented.

The characteristic feature of my invention as it respects its operation is the production of a diffused and gentle streams of atmospheric air of great volume as distinguished from the intense or sharp condensed blast of the revolving fan. The latter fan is best adapted to the cleaning of seeds or grains which being heavy are mixed with light chaff or hulls, because an intense blast will here more effectually blow out the light substances without blowing away the seeds, and at the same time expedite the operation. But for cleaning garden and many of the smaller grass seeds, which are almost as light as the chaff with which they are mixed, the rotary fan is wholly unsuited, because such seeds would be blown away by it along with the chaff and lost, or, if the fan were revolved slow enough to render the blast so light that it would not blow away the seeds in this case the volume of the stream would be too small to separate the seed from the chaff. These difficulties are entirely obviately by means of my vibratóry fan, which produces a blast of greater or less intensity as it is turned faster or slower, but which is always diffused, gentle, and of great volume, and the distance through which the blast acts upon the chaff and seeds while falling through it seems to compensate for the diminution of instant force with which the current is propelled, and the light seed is as effectually separated from chaff or other substances lighter than itself, by passing a greater distance through a diffused stream of air, as heavy seed is separated from chaff by passing a shorter distance through a condensed stream.

What I claim as my invention and desire to secure by Letters Patent is—

The combination of the two vertical vibratory fans A, $A^2$, with the shoe Q containing the screens and with the case, the fans being vibrated simultaneously in opposite directions in the manner and for the purpose herein set forth.

DAVID WARREN.

Witnesses:
WM. P. ELLIOT,
A. E. H. JOHNSON.